United States Patent [19]

Morris

[11] 4,149,739
[45] Apr. 17, 1979

[54] DUAL PASSAGE PIPE FOR CYCLING WATER TO AN UNDERSEA MINERAL AGGREGATE GATHERING APPARATUS

[75] Inventor: Wilford V. Morris, Houston, Tex.

[73] Assignee: Summa Corporation, Las Vegas, Nev.

[21] Appl. No.: 779,272

[22] Filed: Mar. 18, 1977

[51] Int. Cl.² ............................................. F16L 39/00
[52] U.S. Cl. ................................ 285/133 R; 285/334; 37/72; 37/DIG. 8
[58] Field of Search .............. 285/133 R, 133 A, 138, 285/140; 138/114, 113; 302/64; 37/72, DIG. 8

[56] References Cited

U.S. PATENT DOCUMENTS

| 1,647,386 | 11/1927 | Weis | 285/133 A UX |
| 3,065,807 | 11/1962 | Wells | 285/133 A X |
| 3,167,333 | 1/1965 | Hall et al. | 285/140 |
| 3,317,221 | 5/1967 | Brown | 285/133 R X |
| 3,672,725 | 6/1972 | Johnson | 37/DIG. 8 |

Primary Examiner—Clifford D. Crowder
Attorney, Agent, or Firm—Robert A. Felsman

[57] ABSTRACT

A dual passage string of pipe for use in cycling fluid from a ship to an undersea mineral aggregate gathering apparatus. The string of pipe is made up of sections of concentric inner and outer pipes. The outer pipes are screwed together and the inner pipes slide telescopically within each other. The inner pipes are suspended in the outer pipes at their upper ends by a rigid supporting ring supported by an internal shoulder in the outer pipe. The internal shoulder is located at the base of the threads and is separated from the lower end of the male threaded section. A resilient seal ring is carried between the supporting ring and the male threaded section for preventing water from entering the threads to avoid corrosion.

4 Claims, 10 Drawing Figures

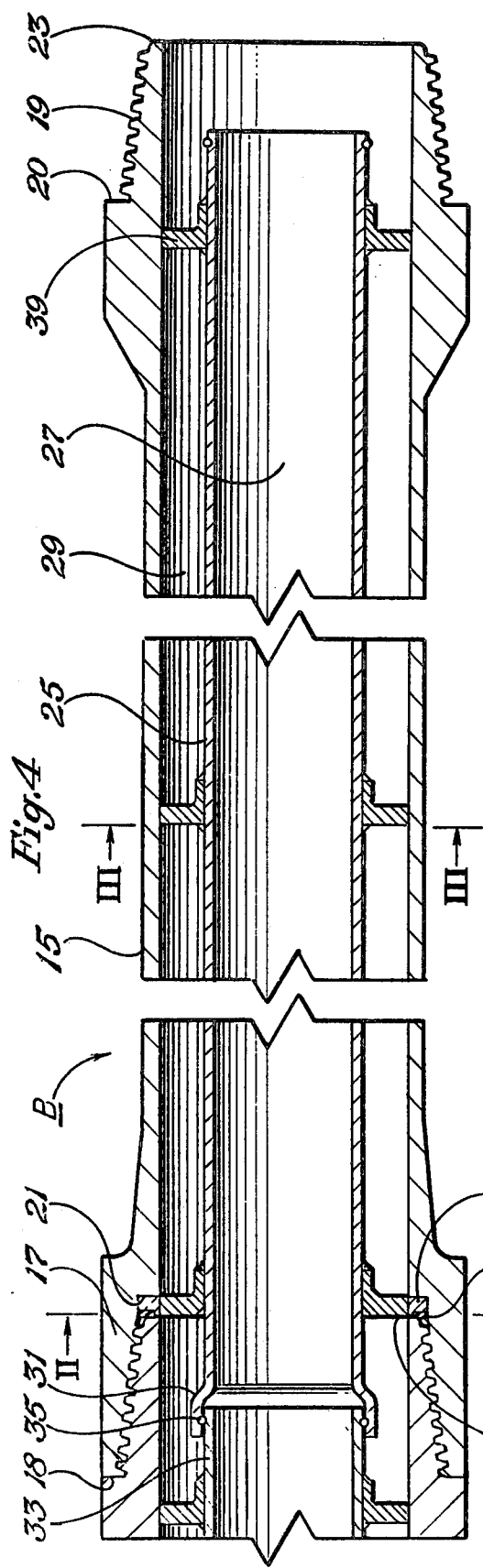
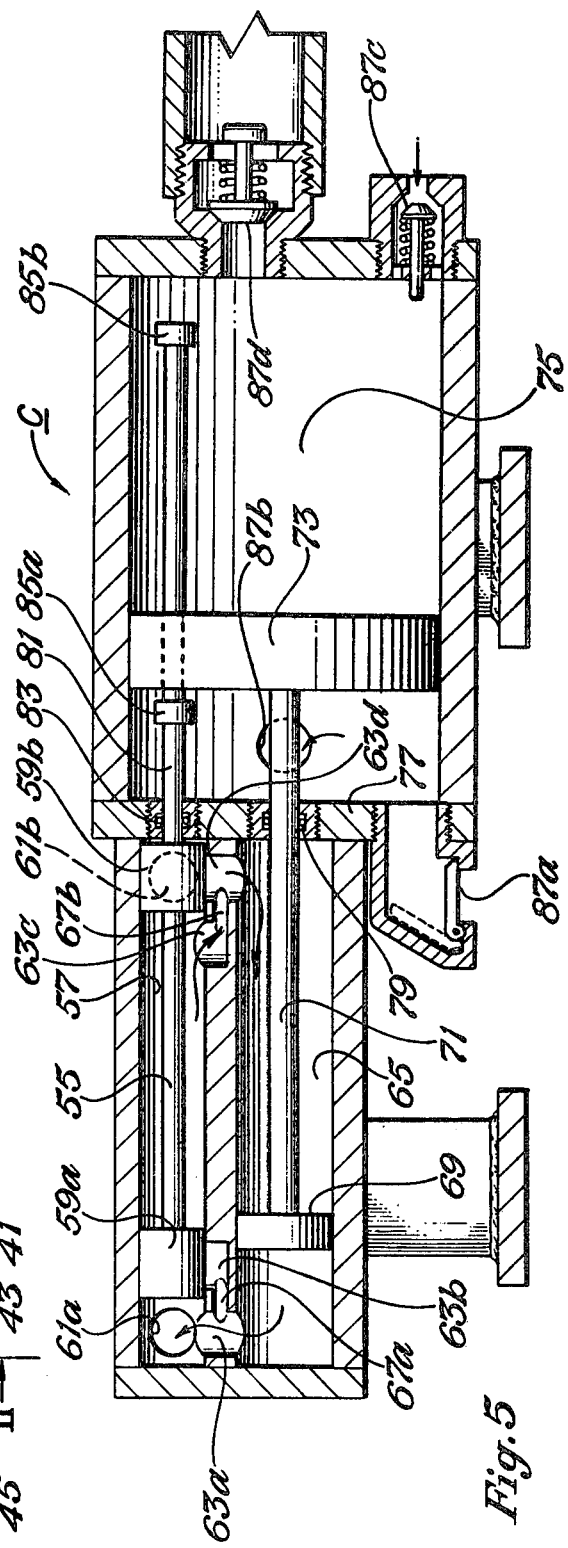
Fig.4
Fig.5

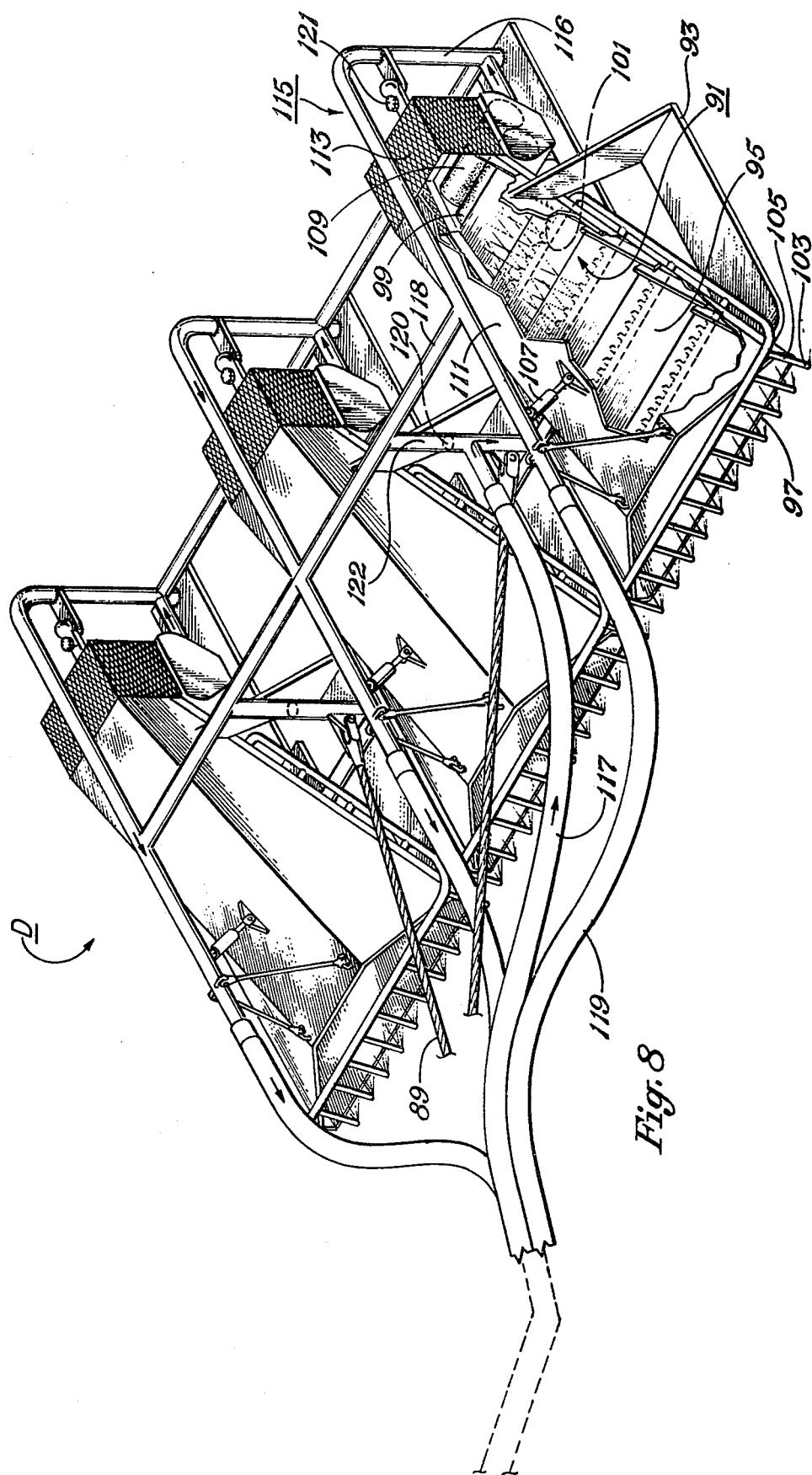

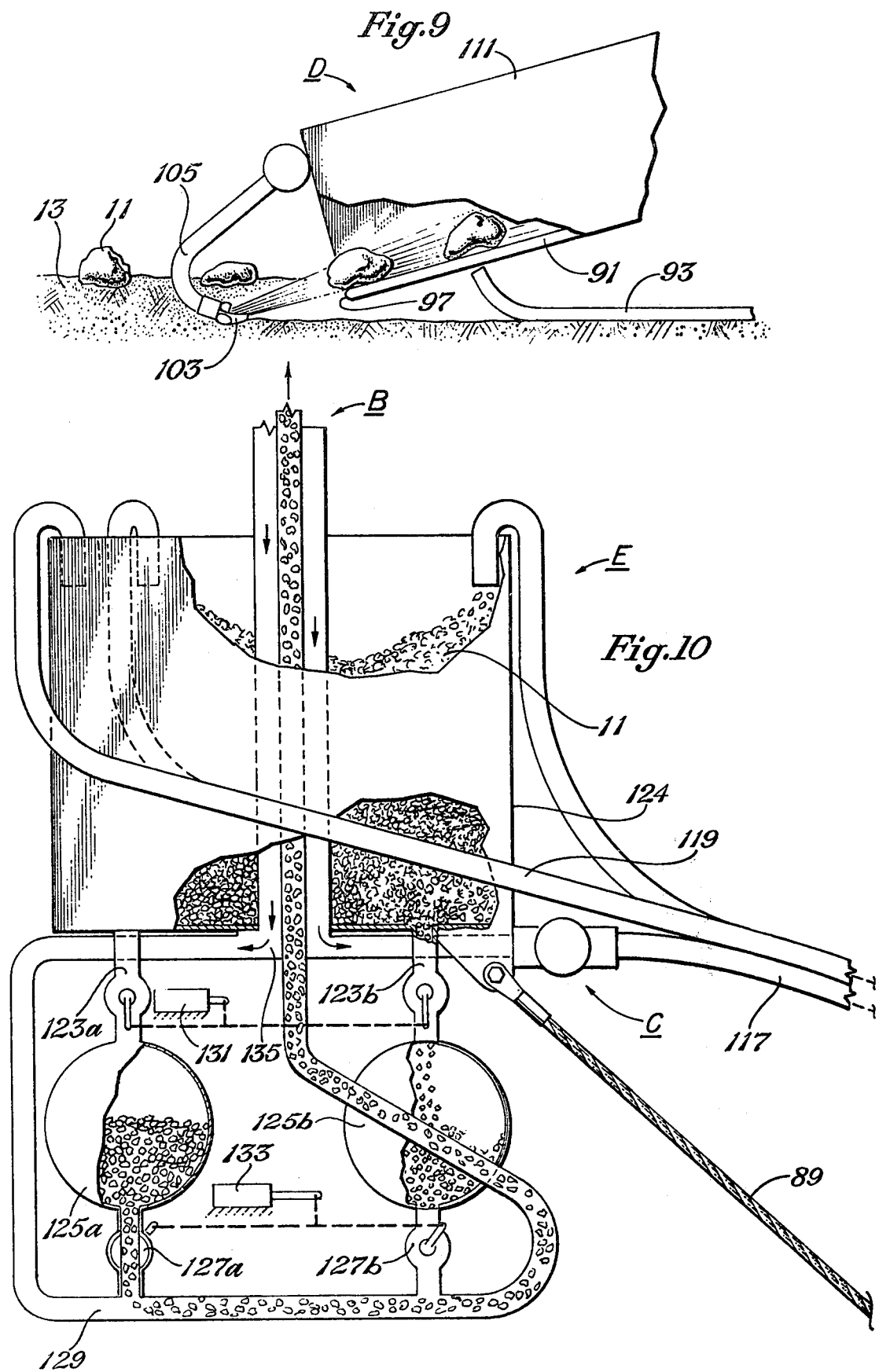

DUAL PASSAGE PIPE FOR CYCLING WATER TO AN UNDERSEA MINERAL AGGREGATE GATHERING APPARATUS

BACKGROUND OF THE INVENTION

1. Field of the Invention

This invention relates in general to the mining of minerals from underwater and in particular to the harvesting of mineral nodules located on the floor of an ocean.

2. Description of the Prior Art

Ferromanganese nodules or aggregates are known to exist in large quantities on ocean floors, frequently at depths varying from 5,000 to 19,000 feet. Previously, means have been suggested for scraping or picking up the loose aggregates from the sea floor and transmitting them to the surface. U.S. Pat. No. 3,588,174 discloses a collector that is towed across the undersea floor, dislodging the aggregates partially by water spray, the aggregates being pumped to the surface in a stream of water within a conduit. U.S. Pat. No. 3,802,740 and Canadian Pat. No. 692,998 disclose devices that also collect aggregates from an undersea floor and transmit them in a conduit to the surface. Such devices convey the collected aggregate to the surface by utilizing submerged pumps. A submerged pump usually requires a protective capsule and may be difficult to service, especially at great depths.

It is known to use dual concentric pipes for well drilling, as shown in U.S. Pat. No. 1,461,240, where water is pumped down the annulus, then returned up the inner pipe to create a suction to draw loose material from the floor. This education system cannot be used with the high hydrostatic pressure that occurs at depths of 5,000 to 19,000 feet. Dual concentric pipes are also known in well drilling using gas as a circulation medium, as in U.S. Pat. No. 3,065,807.

SUMMARY OF THE INVENTION

The invention may be summarized as an underwater harvester of mineral nodules or aggregates that uses a dual concentric string of pipe extending from a surface vessel to a submerged gathering apparatus for supplying water and power to the gathering apparatus and for conveying the aggregate to the surface. Water is pumped down an annular passage in the dual string and through a conduit loop leading to an inner pipe. Crushed and collected aggregates are placed into the conduit loop for conveyance to the surface. A portion of the downward flow is distributed to the harvester for collecting and crushing the aggregates.

BRIEF DESCRIPTION OF THE DRAWING

FIG. 4 is a vertical cross sectional view of a dual pipe used in conjunction with the mining equipment shown in FIG. 1.

FIG. 5 is a partial cross sectional view of a pressure converter used in conjunction with the mining equipment of FIG. 1.

FIG. 8 is perspective view, partially broken away, of a gathering apparatus used in conjunction with the apparatus of FIG. 1.

FIG. 9 is an enlarged fragmentary side elevational view, partially broken away, of the gathering apparatus of FIG. 8.

FIG. 10 is a storage bin and feeder mechanism used in conjunction with the mining apparatus of FIG. 1.

DESCRIPTION OF THE PREFERRED EMBODIMENT

Figure 1:
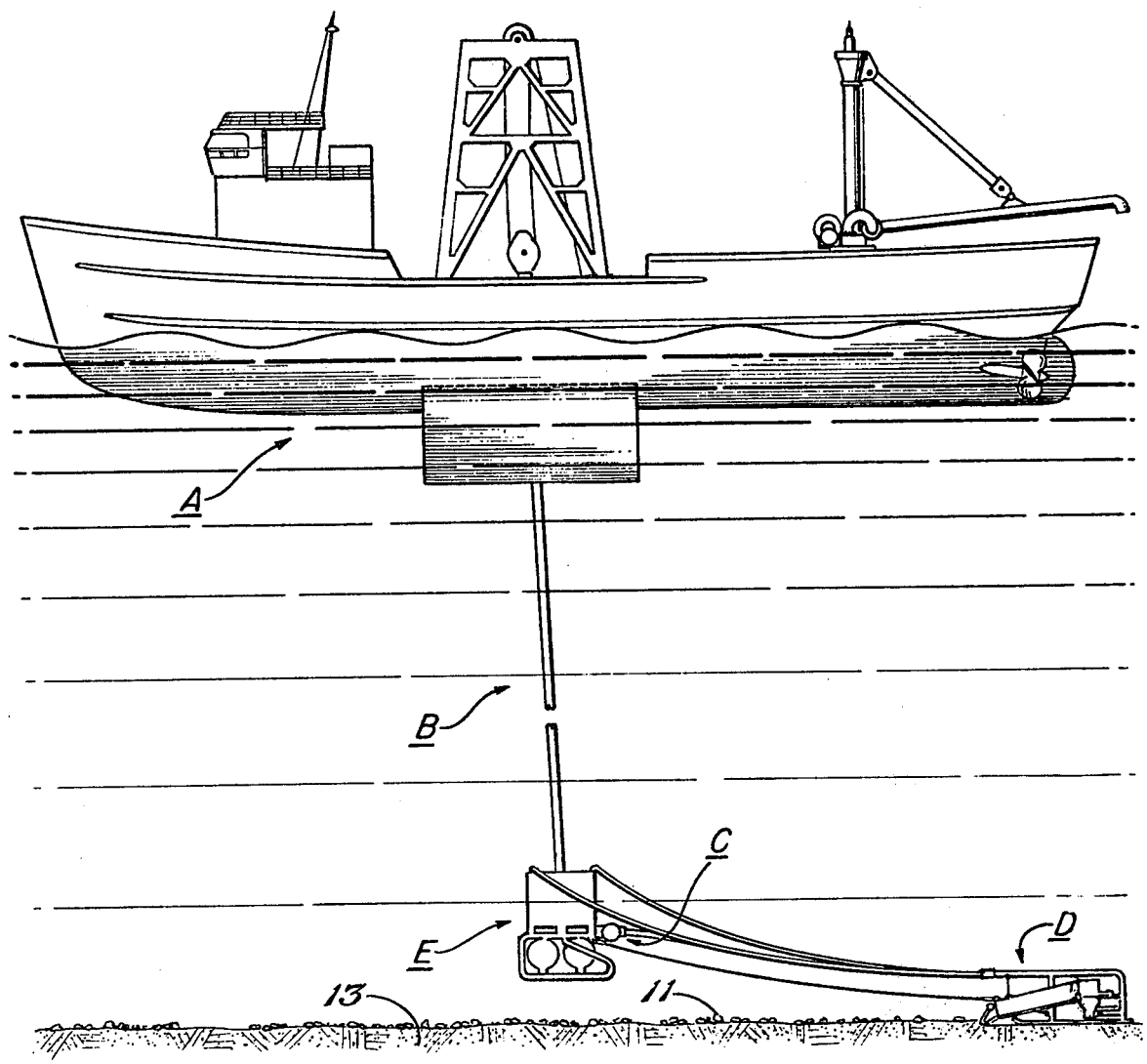
FIG. 1 is a schematic view of apparatus constructed in accordance with the teachings of this invention.

FIG. 1 illustrates schematically the mining apparatus for mining mineral aggregates or nodules 11 from an undersea floor 13, including a surface vessel A for towing the undersea equipment. A string of dual concentric pipes B, connected from the surface vessel A to the undersea equipment, serves as a tow line and as a conduit for water pumped from the surface vessel to the undersea equipment and back to the surface along with crushed nodules. A pressure converter C converts the high pressure stream of water being pumped by the pumps on the surface vessel to a lower pressure higher volume for use with the gathering apparatus D. The gathering apparatus D collects and crushes the nodules 11 and conveys them to a temporary storage bin and feeder mechanism E. Storage bin and feeder mechanism E, suspended at the end of the dual string approximately 50 feet above the undersea floor surface 13, tows the gathering apparatus D approximately 200 feet behind it. The bin and feeder mechanism E temporarily stores the crushed nodules 11, and gravity feeds them into the dual pipe B for transmission to the surface. The pressure converter C, gathering apparatus D, and storage bin and feeder mechanism E serve as harvesting apparatus or means for collecting and transmitting the aggregates to the surface vessel.

Dual Pipe

Figure 2:
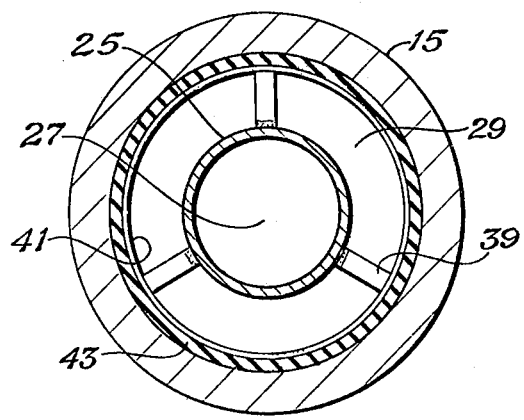
FIG. 2 is a cross sectional view of the dual pipe for use with the mining equipment of FIG. 1, as seen looking along the lines II—II of FIG. 4.
Figure 3:
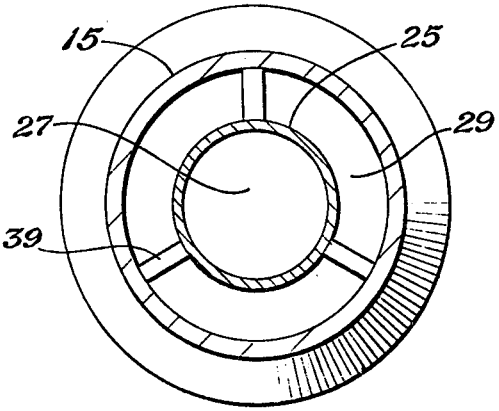
FIG. 3 is a cross sectional view of the dual pipe shown in FIG. 4 as seen looking along the lines III—III.

The dual pipe string B is shown in FIGS. 2, 3, an 4. Referring to FIG. 4, wherein the upper end of the pipe is on the left side of the drawing, an outer pipe 15 is made up of a plurality of sections or stands, each 30 or more feet long. Each stand contains an externally upset threaded box section 17 on its upper end and an externally upset threaded pin section 19 on its lower end, defining a joint for screwing the stands together. The box section 17 and pin section 19 each have external shoulders 18, 20, respectively, to limit the make-up position. The box section 17 has an internal shoulder 21 that is spaced a selected distance below the end 23 of the threaded pin 19 when fully made up.

An inner pipe 25 is carried concentrically within the outer pipe 15, and is made up of a plurality of sections or stands to form a continuously open inner passage 27 and an annular passage 29 between the walls of the inner pipe 25 and outer pipe 15. The upper end of each stand of inner pipe 25 has an enlarged portion 31 for receiving the lower end 33 of the upper stand, defining a joint for connecting the inner pipe stands together. The lower ends 33 are cylindrical and fit telescopingly within the enlarged portion 31. A seal 35, between the inner end 33 and enlarged portion 31, prevents leakage.

Each stand of inner pipe 25 has a plurality of centralizers or spokes 39 attached to the inner pipe 25 and closely received within the outer pipe to maintain the pipes in concentric relation to each other. As shown in FIGS. 2 and 3, each set of spokes 39 is a group of two or more, preferably three radial projections spaced apart 120° for allowing water to pass through the annular passage 29. One set of spokes 39 is located near the lower end of the inner pipe stand 25 and another near the middle. The upper set of spokes 39, located near the enlarged portion 31 has a rigid metal ring 41 attached to the periphery of the spokes 39 for carrying the inner pipe 25 within the outer pipe 15. Ring 41 is larger than the inner diameter of the outer pipe 15 and rests on internal shoulder 21 of the outer pipe 15. A resilient ring seal 43 is seated within a shoulder on the upper side and outer portion of ring 41. The inner width of seal 43 extends from the outer periphery of ring 41 inward to a point slightly short of the inner wall of the outer pipe 15, so that while deformed no part of the seal will be extended into the annular passage where a high flow rate of water occurs. Seal 43 is thicker than its shoulder within which it seats, so that the seal is deformed by the end 23 of the threaded pin 19 when the outer pipe stands are fully made up. The distance between the internal shoulder 21 and end 23 of threaded pin 19 when the outer stands are fully made up is slightly larger than the width of the metal ring 41 so that a clearance 45 exists when the outer pipes 15 are fully made up. Seal 43 minimizes leakage into the threads from the annular passage 29. It is expected that the string of dual pipes B would not be pulled very often, thus frequent inspection or cleaning of threads would not be possible, resulting in corroded threads if a seal was not present.

A suitable inner pipe 25 is 10¾ inch outer diameter, J-55, 44 pounds per foot A.P.I. (American Petroleum Institute) casing with 0.400 inch wall thickness. A suitable outer pipe 15 is 20 inch outer diameter, X-135 grade, 104 pounds per foot A.P.I. casing or line pipe with ½ inch wall. The pipes may be lowered into the sea by screwing the outer stands 15 together, while the inner pipes 25 simultaneously telescope and seal within each other. When pulling the string, the inner pipes may be removed for cleaning, inspection, or may be racked and stored within the outer pipes.

PRESSURE CONVERTER

Figure 6:
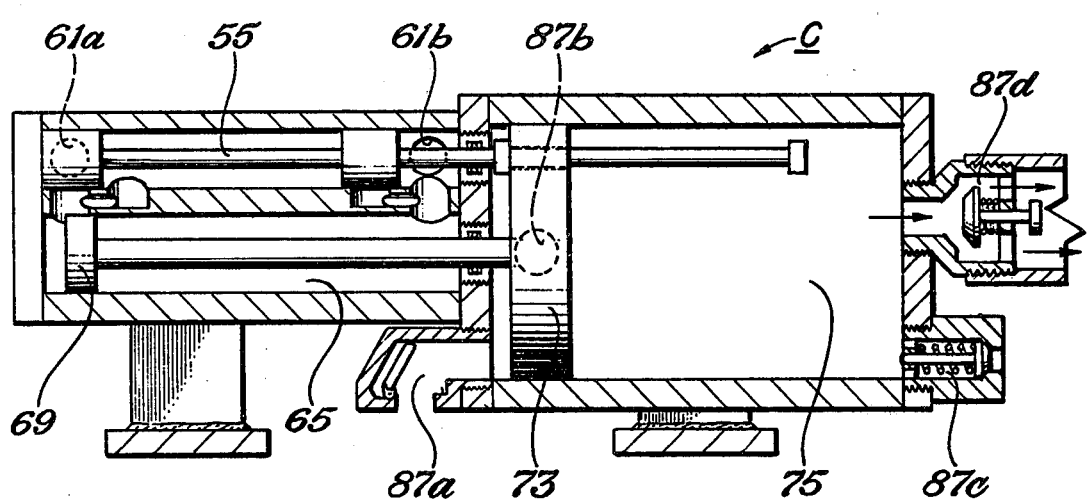
FIG. 6 is a partial cross sectional view of the pressure converter of FIG. 5 with its sliding valve shown in a different position.

A portion of the water pumped down the annular passage 29 will be returned along with crushed nodules 11 up the inner passage 27, while another portion will be used to collect and crush the nodules. The flow pressure at the bottom of the drill string should be relatively high, for example 2000 psi., while only 200 psi. is required for collecting and crushing. This pressure is converted by pressure converter C as shown in FIGS. 5, 6, and 7.

Figure 7:
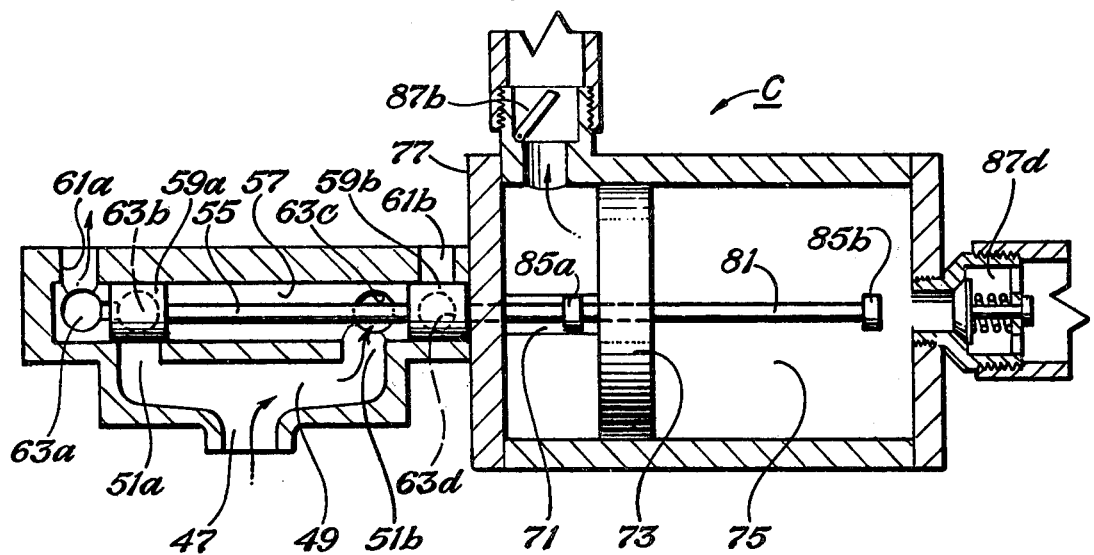
FIG. 7 is a partial cross sectional view of the pressure converter of FIG. 5 as seen from the top as shown in the drawing.

Referring to FIG. 7, a high pressure inlet 47 leads to a manifold 49 that has two inlet ports 51a, b spaced apart from each other. A sliding valve 55 is located in a cylindrical valve chamber 57 adjacent the inlet ports 51a, b. The valve 55 has two cylindrical plugs 59a, b closely received in the valve chamber 57 and of width at least equal to inlet ports 51a, b so that they may be closed by the plugs 59a, b. The plugs 59a, b are spaced apart on a shaft so that when one port 51 is covered, the other port is fully opened. Two exhaust ports 61a, b are located on the opposite sides of ports 51a, b, and are of a size sufficient to be closed by plugs 59a, b. The exhaust ports 61a, b may lead to the surrounding sea, or be used for other high pressure uses. The exhaust ports 61a, b are spaced so that when one is closed by plug 59, the other exhaust port is open. The exhaust ports 61a, b are spaced one port width wider on each end than the inlet ports 51a, b so that when an exhaust port is open on one side, the corresponding inlet port on that side will be closed.

Four ports 63a, b, c, d are located on the lower surface of the cylindrical valve chamber as shown on the drawing, two ports being adjacent each end of the valve stroke. Ports 63 are of a size to be closed by the plugs 59 and are spaced so that when one port 63 on each end is closed, the other port on the same end is open. Also on each end, one port 63 is aligned with an exhaust port 61 and one port 63 with an inlet port 51, so that they may be closed simultaneously by the valve plugs 59. In the position as shown in FIG. 7, inlet port 51a is closed along with port 63b, while port 63a and exhaust port 61a are open. Intake port 51b is open along with port 63c, while exhaust port 61b and port 63d are closed. Valve 55 may be reciprocated within the valve chamber 57 to reverse the opening and closing of ports.

Referring to FIG. 5, ports 63a, d, lead directly to a high pressure chamber 65. Port 63b, c are connected by internal passages 67a, b to ports 63a, d, thus also lead to high pressure cylindrical chamber 65. A high pressure piston 69 is reciprocally carried in the high pressure cylinder 65 and is connected by a shaft 71 to a substantially larger piston 73 in an adjacent low pressure cylindrical chamber 75. High pressure chamber 65 is separated from low pressure chamber 75 by a wall 77 through which the shaft 71 slidably passes. A seal 79 within wall 77 prevents leakage from the high pressure chamber 65 to the low pressure chamber 75.

Wall 77 also provides separation between the valve chamber 57 and the low pressure chamber 75. A shaft 81 slidably passes through wall 77 and also through low pressure piston 73. A seal 83 within wall 77 prevents leakage from the valve chamber 57 to the low pressure cylinder 75. Enlarged portions 85a, b, provided on shaft 81, are larger than the aperture in low pressure piston 73 within which the shaft 81 loosely passes. The enlarged portions 85a, b are spaced apart a selected distance so as to be contacted by the low pressure piston 73 near each end of its stroke to shift the valve 55 to the opposite position.

Four one-way valves 87a, b, c, d, two opposite each end, are located in the low pressure chamber 75. On each end, the one-way valves are opposed so that when the piston 73 is moving toward them, the inward opening valve, or intake valve, will be closed and the outward opening valve will be open. The intake valves allow water to enter from the surrounding sea when open. The outlet valves are connected to the gathering apparatus D. Valves 87c, d are shown as poppet-type, while valves 87a, b are shown as hinged-type. These types may be interchanged and other valves used as well.

In operation, high pressure water pumped through the annular passage 29 will pass to inlet 47 of the manifold 49. If the pressure converter C is in the position as shown in FIGS. 5 and 7, the high pressure water will flow into the valve chamber 57 via inlet port 51b as shown by the arrows. This high pressure water flows then through port 63c, since port 63b is closed by plug 59a, and since access to exhaust port 61b is blocked by plug 59b. Referring to FIG. 5, the high pressure water then flows, as indicated by the arrows, down into the right hand side of the high pressure cylinder 65. This forces the high pressure piston 69 to the left, drawing with it the low pressure piston 73. Water within chamber 75 on the left of low pressure piston 73 will be forced out the outlet port 87b, the intake port 87a remaining closed since it operates only one way. This water flow then passes to the gathering apparatus D. The exhaust fluid from high pressure chamber 65 on the left side of piston 69 proceeds through port 63a out exhaust port 61a.

When low pressure piston 73 nears the end of its stroke, it will contact enlarged portion 85a, pushing valve 55 to the left, as shown in FIG. 6. In the position shown in FIG. 6, high pressure can no longer enter the high pressure chamber on the right side of the piston because inlet port 51b will be blocked. The high pressure water flow rather enters through the now opened inlet port 51a and port 63b. This causes the piston 69 to move to the right pushing piston 73. High pressure fluid on the right side of high pressure piston 69 will be exhausted through port 63d out exhaust port 61b. As the low pressure piston 73 is pushed to the right it will force fluid out outlet valve 87d, as shown in FIG. 6. At the same time intake valve 87a will open, allowing surrounding sea water to enter the low pressure chamber 75 on the left side of low pressure piston 73. When low pressure piston 73 nears the end of its stroke to the right, it will contact enlarged portion 85b, shifting valve 55 back to the right as shown in FIG. 5, and thereby causing reciprocation.

The output pressure is lowered by a factor proportional to the different cross-sectional areas of the pistons 69 and 73. A suitable size of pressure converter for converting 625 gallons per minute at 2000 psi. to 6,250 gallons per minute at 200 psi. consists of a one foot diameter high pressure piston 69 and a three foot diameter low pressure piston 73, with a five foot stroke. Linear piston speed is kept below two feet per second to give an approximate five second stroke.

GATHERING APPARATUS

Referring to FIGS. 8 and 9, the gathering apparatus D, towed on the undersea floor 13 by cable 89, comprises an inclined ramp, chute, or channel 91 carried on a frame or skis 93. Channel 91 is passive and is made up of a plurality of overlapping sheets 95 decreasing in width from the leading edge 97 to the rearward edge 99. A row of flat jet nozzles 101 are mounted at each overlapped intersection to direct water spray up the channel 91. A leading row of flat jet nozzles 103 are mounted in front of the channel 91 on curved pipes 105. Pipes 105 are oriented so that the nozzles 103 are slightly beneath the undersea floor surface, which is normally covered with sediment. The nozzles 103 are directed generally upward and rearward, toward the inclined channel 91. The inclination of channel 91 controls the depth at which the leading edge 97 cuts the surface. Preferably the leading edge 97 is level or slightly lower then the undisturbed undersea floor 13. The inclination is controlled by hydraulic cylinders 107, which are in turn controlled from the surface vessel A.

A pair of cylindrical roller crushers 109 are mounted directly behind rearward edge 99, with the tops of the rollers level or below the edge 99 so that nodules will fall into the rollers to be crushed. The roller crushers 109 are corrugated, rotate in opposite directions to each other, and are spaced apart a selected distance for the desired crushed size. The axes of the rollers are perpendicular to the direction of travel of the gathering apparatus D. The roller crushers 109 are rotated by a water motor, which is actuated by water pressure from pressure converter C.

A cover 111 of sheet metal encloses inclined channel 91 to prevent nodules from escaping. An expanded metal enclosure 113 covers the area above roller crushers 109 to prevent nodules from escaping but allows turbid water to flow through.

In the preferred embodiment, three channels 91 are connected together in parallel. An eduction system 115 comprised of metal conduits extends over and around the channels 101 to provide a frame or support, and to convey water to the nozzles 91, 103, roller crushers 99, and the return flow to bin and feeder mechanism E.

A conduit 116 extends below, around the back and over each crusher 109 and channel 91. These conduits are interconnected by upper and lower transverse conduits 118 to provide a frame for three channels 91. Plugs 120 are located within vertical conduits 122 spaced between the upper and lower transverse conduits 118 to prevent incoming flow from entering the return portion of conduits 116.

Fluid converter C provides a large volume of water at approximately 200 psi. through a flexible hose 117 to the eduction system 115. A portion of the supply water passes beneath roller crushers 99 as indicated by the arrows to educt or draw the crushed nodules along the eduction system 115 to flexible hoses 119 for conveyance to bin and feeder mechanism E.

The hydraulic cylinder 107 for each channel 91 extends between the eduction system 115 and the cover 111. Tow hitches 121, located between the enclosure 113 and eduction system 115 allow lateral and longitudinal flexing.

In operation the surface vessel A tows the gathering apparatus D at a slow rate by the dual pipe B, bin and feeder mechanism E, and cable 89. Water flow, supplied from the surface pumps through the annular passage 29 of the dual string B and through the pressure converter C, is sprayed out nozzles 103 to dislodge nodules 11 as the sled is towed along on its skis 93. Nozzles 101 force the nodules up the inclined channel 91, further dislodging sediment. The nodules are then crushed by roller crushers 109, and further sediment is freed. Portions of this sediment will flow out through enclosure 113. The turbid water and crushed nodules are drawn or educted through conduits 116 and hoses 119 to bin and feeder mechanism E. The turbid water and sediment is diluted by the fresh water being pumped from pressure converter C through hoses 117 to the eduction system 115. The size of the nodules varies but they are normally found within the range from three to six inches in diameter. It is expected to crush them to $\frac{1}{2}$ inch maximum diameter.

BIN AND FEEDER MECHANISM

Referring to FIG. 10, the crushed nodules are educted along conduits 119 to bin 124. The conduits are simply hooked over the open topped bin for discharging the aggregate. Two ball valves 123a, b are located below the bottom of bin 124, and provide communication to the feeder mechanism 125. The feeder mechanism 125 comprises two spherical chambers 125a, b mounted below bin 124 and ball valves 123a, b. Two ball valves 127a, b are located below the bottom of the feeder chambers 125 and provide communication to a conduit 129. Ball valves 123 are opposed to each other and opposed to ball valves 127. That is, as shown in FIG. 10 when the top valve 123b is open, its corresponding bottom valve 127b is closed. Simultaneously top valve 123a of feeder chamber 125a will be closed and bottom valve 127a open. Ball valves 123, 127 are operable by hydraulic actuaters 131, 133, controlled at the surface or by other sensor means.

Conduit 129 extends from below the bottom valves 127 in a loop up to a "T" intersection or distribution chamber 135. Distribution chamber 135 is located below the bottom of bin 124 and at the end of the dual pipe string B. Distribution chamber 135 is in communication with the water supplied from the annular passage 29, and distributes a portion of this water to the pressure converter C and to conduit 129. The downstream end of conduit 129 is in communication with the inner passage 27 of dual string B.

In operation one feeder chamber 125 will be emptying into conduit 129 while the other feeder chamber 125 will be filling. As shown in FIG. 10, feeder chamber 125a is emptying into conduit 129, its top valve 123a being closed and its bottom valve 127a being open. At the same time feeder chamber 125b is filling, its top valve 123b being open, and its bottom valve 127b being closed. The aggregates fall into the conduit 129 at rate of about one feet per second. As the feeder chamber 125a is being emptied, clean water pumped from the surface through conduit 129 will fill the chamber. When substantially all of the aggregates have been emptied from feeder chamber 125a, valve 127a will close and valve 123a will open. Aggregates from the bin will then fall into the feeder chamber 125a. As they fall, the water in the chamber that they displace will rise up into the bin 124, displacing the turbid water, which flows over the sides of the open topped bin. This eliminates much of the sediment from the water and further cleanses the nodules prior to being transmitted to the surface. As feeder chamber 125a is refilling, feeder chamber 125b is releasing aggregates into conduit 129. Consequently a continuous stream of aggregates will be provided up the inner passage 27.

The high pressure obtainable by the surface pumps allows a relatively high solids - low volume content of up to 37% crushed nodules by weight. The filling and feeding cycle is expected to take approximately five minutes. In the preferred embodiment, a 20 foot diameter 30 foot high bin 124 is used. Feeder chambers 125a, b are 12 feet in diameter, and 12 inch ball valves 123, 127 are used.

It is accordingly seen that an invention having significant improvements has been provided. Use of the dual string provides water power for collecting, crushing, and transmitting aggregate to the surface, without the need for downhole pumps.

While this invention has been described in only one of its forms it should be apparent to those skilled in the art that it is not so limited but is subject to various changes and modifications without departing from the spirit or scope thereof.

I claim:

1. A string of dual pipe for use with an undersea gathering apparatus of the type that collects mineral aggregates from an undersea floor and conveys them to the surface comprising:

upper and lower stands of outer pipe interconnected by a joint having an externally upset threaded box section on the lower stand and an externally upset threaded pin section on the upper stand screwed into the box section;

the box section and the pin section having external shoulders that engage each other when fully made up to limit the make-up position and prevent water surrounding the outer pipe from entering the threads, the box section having an internal shoulder spaced a selected distance from the end of the pin section when fully made-up;

upper and lower stands of inner pipe contained respectively within the upper and lower stands of outer pipe and concentrically spaced therefrom to form continuously open inner and annular passages;

an inner joint innerconnecting the ends of the inner stands formed by an outer enlarged end of one inner stand receiving the end of the next stand in sliding telescoping relation;

a rigid supporting ring mounted to the inner pipe and carried on the internal shoulder of the outer pipe box section for supporting the inner stands, the supporting ring having passage means to allow water to pass through the annular passage; and a resilient seal ring carried between the supporting ring and the end of the pin section for preventing water from entering the threads from the annular passage.

2. The apparatus according to claim 1 wherein the resilient seal ring is carried on an annular recessed shoulder of the ring, the thickness of the seal ring being sufficiently greater than the depth of the shoulder so that when the outer pipe stands are fully made-up, the end of the pin section deforms the seal ring and does not contact the supporting rigid ring.

3. The apparatus according to claim 2 wherein the supporting ring is mounted to the inner pipe by radially spaced external projections spaced apart, the spaces between each projection serving as passage means to allow water to pass through the annular passage.

4. The apparatus according to claim 3 wherein the outer diameter of the seal ring equals the diameter of the internal shoulder and the inner diameter of the seal ring is sufficiently greater than the inner diameter of the outer pipe so as to be deformed for sealing without protruding into the annular passage.

* * * * *